United States Patent
Keller

(10) Patent No.: US 11,919,751 B2
(45) Date of Patent: Mar. 5, 2024

(54) TRANSPORT VEHICLE, METHOD FOR RECEIVING A LOAD BY MEANS OF A TRANSPORT VEHICLE, AND SYSTEM COMPRISING A TRANSPORT VEHICLE AND A LOAD

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 84 days.

(21) Appl. No.: 17/620,750

(22) PCT Filed: May 26, 2020

(86) PCT No.: PCT/EP2020/064558
§ 371 (c)(1),
(2) Date: Dec. 20, 2021

(87) PCT Pub. No.: WO2020/254073
PCT Pub. Date: Dec. 24, 2020

(65) Prior Publication Data
US 2022/0402730 A1    Dec. 22, 2022

(30) Foreign Application Priority Data
Jun. 21, 2019    (DE) ..................... 10 2019 116 809.0

(51) Int. Cl.
*B66C 19/00*    (2006.01)
*B62D 7/02*    (2006.01)
(Continued)

(52) U.S. Cl.
CPC ............ *B66C 19/005* (2013.01); *B62D 7/026* (2013.01); *B62D 7/04* (2013.01); *B62D 7/1509* (2013.01);
(Continued)

(58) Field of Classification Search
CPC ........... B66C 19/005; B66C 5/02; B62D 7/04
See application file for complete search history.

(56) References Cited

U.S. PATENT DOCUMENTS 4,263,979 A * 4/1981 Sturgill ................ B62D 7/1509
                                                    180/411
4,265,326 A   5/1981 Lauber
(Continued)

FOREIGN PATENT DOCUMENTS

DE    1 209 259 B    1/1966
DE    1209259 B *    1/1966
(Continued)

OTHER PUBLICATIONS

Translation of DE1209259, Jan. 20, 1966, obtained from EPO (Year: 1966).*

*Primary Examiner* — Minnah L Seoh
*Assistant Examiner* — Hosam Shabara
(74) *Attorney, Agent, or Firm* — Norman B. Thot

(57) ABSTRACT

A transport vehicle includes a base, wheels connected to the base, and load receiving elements. At least two of the wheels have a track width therebetween in each of a transverse drive and in a longitudinal drive. The track width in the longitudinal drive and the track width in the transverse drive are each variable. The transport vehicle is transports a load having a longitudinal direction and a transverse direction between the wheels. The transport vehicle is drivable both in the transverse drive and in the longitudinal drive.

10 Claims, 11 Drawing Sheets

(51) Int. Cl.
  *B62D 7/04* (2006.01)
  *B62D 7/15* (2006.01)
  *B66C 1/22* (2006.01)
  *B66C 5/02* (2006.01)
  *B66C 9/14* (2006.01)

(52) U.S. Cl.
  CPC ............... *B66C 1/22* (2013.01); *B66C 5/02* (2013.01); *B66C 9/14* (2013.01)

(56) References Cited

U.S. PATENT DOCUMENTS

| | | | | |
|---|---|---|---|---|
| 4,823,899 | A * | 4/1989 | Ron | B62D 7/1509 180/422 |
| 6,206,127 | B1 * | 3/2001 | Zakula, Sr. | B66C 19/007 180/234 |
| 8,215,441 | B2 * | 7/2012 | Wierzba | B66C 19/005 180/242 |
| 11,414,128 | B1 * | 8/2022 | Cui | B62D 7/04 |
| 2003/0180132 | A1 | 9/2003 | Morreim | |
| 2005/0211862 | A1 | 9/2005 | Autenrieth | |
| 2008/0206027 | A1 | 8/2008 | Manzi et al. | |

FOREIGN PATENT DOCUMENTS

| | | |
|---|---|---|
| DE | 2 220 991 A1 | 11/1973 |
| DE | 20 2004 004 714 U1 | 10/2005 |
| DE | 10 2005 035 614 A1 | 2/2007 |
| EP | 1 862 422 A2 | 12/2007 |
| FR | 2 597 460 A1 | 10/1987 |
| WO | WO 03/068650 A2 | 8/2003 |
| WO | WO 2015/155189 A1 | 10/2015 |

* cited by examiner

TRANSPORT VEHICLE, METHOD FOR RECEIVING A LOAD BY MEANS OF A TRANSPORT VEHICLE, AND SYSTEM COMPRISING A TRANSPORT VEHICLE AND A LOAD

CROSS REFERENCE TO PRIOR APPLICATIONS

This application is a U.S. National Phase application under 35 U.S.C. § 371 of International Application No. PCT/EP2020/064558, filed on May 26, 2020 and which claims benefit to German Patent Application No. 10 2019 116 809.0, filed on Jun. 21, 2019. The International Application was published in German on Dec. 24, 2020 as WO 2020/254073 A1 under PCT Article 21(2).

FIELD

The present invention relates to a transport vehicle comprising a base having wheels which are connected to the base and comprising load receiving elements, wherein the transport vehicle is suitable for transporting a load which has a longitudinal direction and a transverse direction between the wheels.

BACKGROUND

Such a transport vehicle was previously described in DE 2 220 991 A.

The disadvantage of this transport vehicle is that it is not desirably compact and it cannot be used flexibly.

SUMMARY

An aspect of the present invention is to provide a transport vehicle which is improved in this regard, as well as a method for receiving a load using the transport vehicle, and a system having a transport vehicle and a load.

In an embodiment, the present invention provides a transport vehicle which includes a base, wheels connected to the base, and load receiving elements. At least two of the wheels comprise a track width therebetween in each of a transverse drive and in a longitudinal drive. The track width in the longitudinal drive and the track width in the transverse drive are each variable. The transport vehicle is configured to transport a load which has a longitudinal direction and a transverse direction between the wheels. The transport vehicle is drivable both in the transverse drive and in the longitudinal drive.

BRIEF DESCRIPTION OF THE DRAWINGS

The present invention is described in greater detail below on the basis of embodiments and of the drawings in which:

FIG. 4 shows an approaching movement in the longitudinal direction of the load to be picked up;

FIG. 5 shows an approaching movement in the longitudinal direction of the load to be picked up;

FIG. 6 shows the transport vehicle having arrived at the load to be picked up;

FIG. 10 shows an approaching movement in the transverse direction of the load to be picked up;

FIG. 11 shows the transport vehicle having arrived at the load to be picked up;

DETAILED DESCRIPTION

Figure 1:
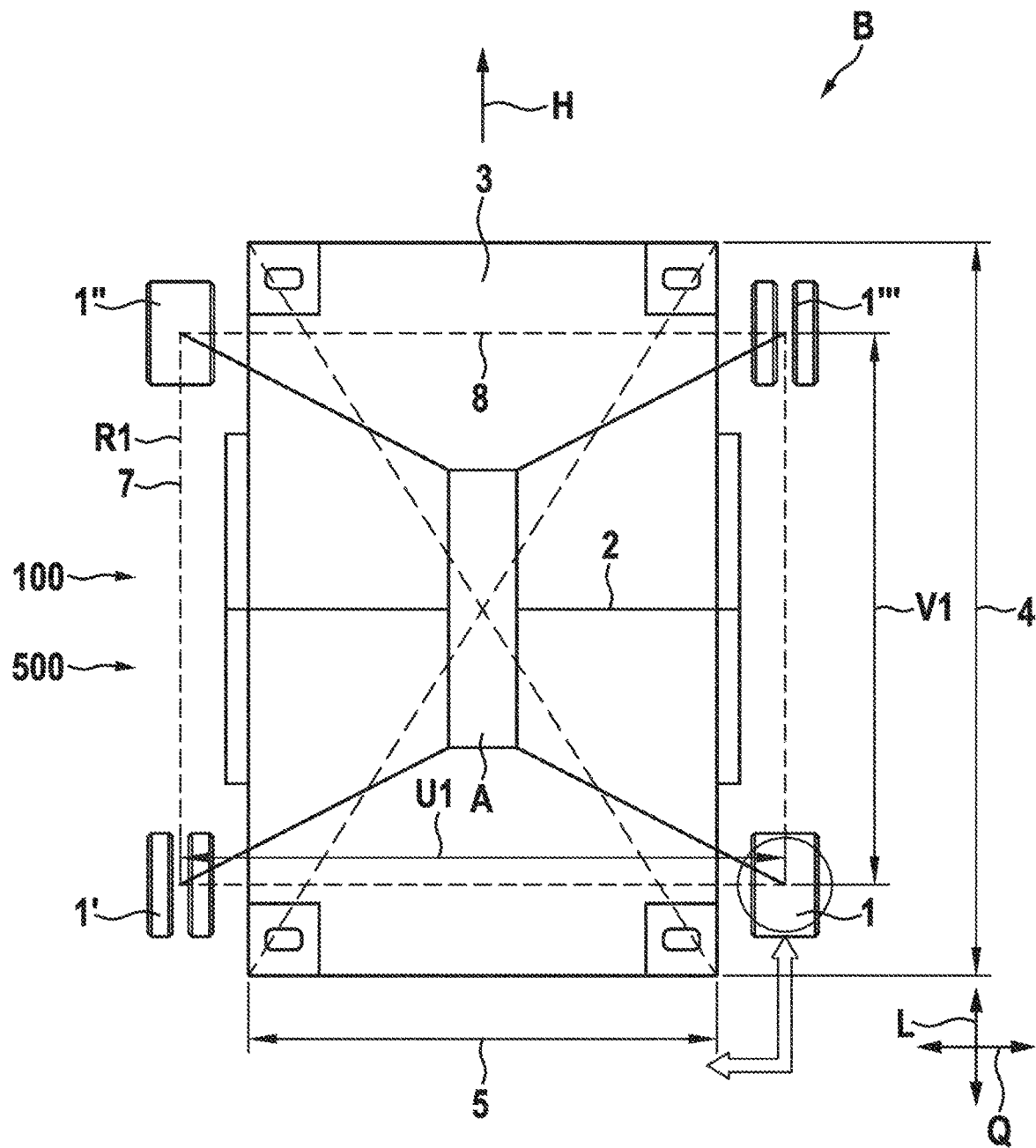
FIG. 1 shows a first embodiment of a transport vehicle according to the present invention in its first state in a view from above.

The transport vehicle according to the present invention can be driven in a transverse drive and in a longitudinal drive.

The transport vehicle can, for example, be a multidirectional vehicle which, in addition to the transverse drive and the longitudinal drive, can, for example, be drivable in a circular drive, also called a carousel drive.

All the wheels of the transport vehicle can, for example, be steered by at least 90°. The transverse drive differs from the longitudinal drive in that, viewed in each case when traveling straight ahead and viewed relative to the base, the wheels are, for example, rotated by 90°. In addition to longitudinal drive and transverse drive, the transport vehicle can also allow diagonal drive.

Both in the transverse drive and in the longitudinal drive, at least two wheels have a track width between each other in each case.

The track in longitudinal drive and the track width in transverse drive are both variable.

This creates a prerequisite for the transport vehicle to be very compact and, in the loaded state, it only needs to be slightly larger than the load.

The track width in longitudinal drive as well as the track width in transverse drive when the transport vehicle is stationary and/or when the transport vehicle is moving and/or when the transport vehicle is unloaded and/or when the transport vehicle is loaded can, for example, be variable.

A driving movement can, for example, be performed with the transport vehicle which positions the transport vehicle relative to the load so that the load is arranged between the wheels. This driving movement is also referred to as "approaching" the load in the context of this publication. The load can, for example have a longitudinal extension and a transverse extension. The longitudinal extension of the load can, for example, be greater than the transverse extension. The load can be a motor vehicle. The load can be a container or racks. As used herein, the term "longitudinal direction of the load" denotes the direction running in the direction of the longitudinal extension of the load. As used herein, the term "transverse direction of the load" denotes the direction running in the direction of the transverse extension of the load.

Both in the transverse drive and in the longitudinal drive, at least two wheels can, for example, have a wheelbase between each other in each case. The wheelbase can, for example, be variable. Both the wheelbase in transverse drive and the wheelbase in longitudinal drive can, for example, be variable. The wheelbase in longitudinal drive and/or the wheelbase in transverse drive when the transport vehicle is stationary and/or when the transport vehicle is moving and/or when the transport vehicle is unloaded and/or when the transport vehicle is loaded can, for example, be variable.

This creates a prerequisite that, for example, a load, the longitudinal extension of which deviates from the transverse extension, can be approached by the transport vehicle both in its longitudinal direction and in its transverse direction, and the wheels of the transport vehicle loaded with the load, for example, nevertheless protrude either in the longitudinal direction of the load beyond the load and not in the transverse direction, or in the transverse direction of the load beyond the load and not in the longitudinal direction.

The load can, for example, have a longitudinal side defining the longitudinal extension. The transport vehicle can, for example, approach a load that is located in the middle of loads parked lengthways next to one another, the long sides of which therefore face one another. The distance between loads placed lengthways next to one another can, for example, be smaller than half the difference between the longitudinal and transverse extension of the load.

The transport vehicle can have three wheels, for example, four wheels. The wheels can comprise single tires or multiple tires such as twin tires.

The transport vehicle can, for example, be suitable for transporting a load which has a longitudinal extension and a transverse extension so that the load is arranged between all the wheels. In the loaded state of the transport vehicle, the weight of the load can, for example, be distributed over all wheels, for example, evenly.

Adjustment elements can, for example, be provided, via which the position of at least two of the wheels relative to the base can be changed.

The adjustment elements can be designed so that these at least two wheels can each perform a translational movement relative to the base. The adjustment elements can therefore provide linear adjustment options. The adjustment elements can be designed so that these at least two wheels can each perform two different translational movements relative to the base. The directions of the two different translational movements can be perpendicular to one another. The adjustment elements can therefore provide linear adjustment options that are perpendicular to one another.

The adjustment elements can be designed so that the at least two wheels can each perform a pivoting movement relative to the base. The pivoting movement can run along a circular path.

The adjustment elements can be designed so that the at least two wheels can each perform either a translational movement relative to the base and a pivoting movement relative to the base or two different translational movements relative to the base. This increases the adaptability of the transport vehicle to differently dimensioned loads compared with an arrangement in which the at least two wheels can only perform a pivoting movement relative to the base.

The at least two wheels, the position of which can be changed relative to the base, can, for example, be arranged adjacently. The position of all the wheels of the transport vehicle relative to the base can, for example, be changed via the adjustment elements. The adjustment elements can, for example, be designed so that all wheels can each perform either a translational movement relative to the base and a movement running along a circular path relative to the base, or that all wheels can each perform two different translational movements relative to the base.

The transport vehicle can, for example, also be suitable for lifting the load between the wheels. A load stored at ground level can, for example, be lifted with the load receiving elements.

The load receiving elements can comprise a carrying fork or a loading platform, similar to what is already known in and of itself from forklifts and similar industrial trucks. It is then in principle conceivable that the transport vehicle can drive under the load with the load receiving elements, for example, a loading platform or a carrying fork, when approaching, so that the load receiving elements are partially arranged under the load. When approaching, it can then be assumed that the load is not at ground level, but rather on a shelf or a pallet.

When approaching, the transport vehicle can, for example, drive over the load, similar to a straddle carrier truck, so that it is partially arranged above the load. The transport vehicle can, for example, approach a load parked at ground level.

The load receiving elements can, for example, comprise suspensions. The load receiving elements can, for example, be arranged on the base. In the loaded state of the transport vehicle, the base can, for example, be arranged above the load. The load receiving elements can, for example, transmit the weight of the load in the loaded state of the transport vehicle to the base.

The transport vehicle can, for example, allow the load to be picked up to be approached both in its longitudinal direction and in its transverse direction. The transport vehicle can, for example, be brought into a first state in order to approach a load in its longitudinal direction and can be brought into a second state in order to approach a load in its transverse direction. The track width can, for example, be smaller in the first state than the track width in the second state. The wheelbase can, for example, be larger in the first state than in the second state.

In the embodiment in which the transport vehicle has four wheels, the transport vehicle can be brought, for example, via the adjustment elements, for example, from a first state, in which the wheels form, for example, viewed from above, the corner points of a first imaginary rectangle with a first side and a second side adjacent thereto, into a second state, in which the wheels form, for example, viewed from above, the corner points of a second imaginary rectangle with a first side and a second side adjacent thereto. The transport vehicle can, for example, be brought from the first state into the second state by changing the position of the wheels relative to the base. The transport vehicle can, for example, be brought from the first state into the second state without changing its rotational position. The length of the first side of the first rectangle can, for example, deviate from the length of the first side of the second rectangle. The length of the second side of the first rectangle can, for example, deviate from the length of the second side of the second rectangle. The first side of the second rectangle can, for example, be longer than the first side of the first rectangle. The second side of the second rectangle can, for example, be shorter than the second side of the first rectangle. The length of the first side of the first rectangle and the first side of the second rectangle can, for example, be defined by the distance between the same wheels of the transport vehicle. The length of the second side of the first rectangle and the second width of the second rectangle can, for example, be defined by the distance between the same wheels of the transport vehicle. The difference in length between the first side of the first rectangle and the second side of the first rectangle can, for example, be smaller than the difference in length between the first side of the second rectangle and the second side of the second rectangle. The first rectangle is therefore, for example, more like a square than the second rectangle. The first side of the second rectangle is, for example, larger than the second side of the second rectangle. The first side of the first rectangle can be larger than the second side of the first rectangle. The sides can be the same size, so the first rectangle can be a square. The first side of the first rectangle is, for example, smaller than the second side of the first rectangle.

The transport vehicle can, for example, comprise a drivable support frame having at least two legs, each having an upper region and a lower region and in the lower region of which one of the at least two wheels, the position of which can be changed relative to the base, is arranged. The drivable support frame can, for example, also comprise a support structure which connects the legs to one another in their upper region. The load receiving elements can, for example, be arranged on the support structure and can, furthermore, for example, extend downward from the support structure. The base can, for example, be part of the support structure.

The legs can be adjustable in length. The height at which the support structure is located can thereby be changed.

The load receiving elements can be displaceable relative to the base. The load receiving elements can be folded out. They can be folded to the side or folded up so as not to hinder the approach of the load, and they can be folded back or down in the middle to pick up the load after the end of this driving movement, when the load is arranged between the wheels. The load receiving elements can have a gripping element which can be brought into engagement with the load. The load can, for example, be gripped from below with the gripping element. The gripping element can be displaced up and down, for example, via a spindle lifting device. Instead of the spindle lifting device, another lifting element, for example a cylinder, such as a hydraulic cylinder, is conceivable. The gripping element can have horizontally displaceable regions, for example, via a spindle lifting device. A cylinder, such as a hydraulic cylinder, may be provided instead of the spindle lifting device.

The legs can, for example, have a portion that extends substantially vertically. This portion can, for example, be longer than 1 m. The legs can, for example, also have a horizontal portion. The horizontal and vertical portions of the legs can be integral.

The support structure can comprise a central connecting piece and a horizontally running pivot beam for each of the at least two legs. The base of the transport vehicle can comprise the central connecting piece or be formed thereby. Four pivot beams can, for example, be provided. The adjustment elements can each comprise a pivot bearing between the pivot beams and the central connecting piece. The pivot beams are then, for example, mounted so as to be pivotable in pairs or individually on the central connecting piece with the pivot bearing. The adjustment elements can also each comprise a linear bearing between the pivot beams and the horizontal portions of the legs, for example, so that the leg can be displaced in a horizontal direction relative to the pivot beam in each case. The linear bearings can, for example, be designed so that the wheel associated with the associated leg can perform a translational movement relative to the base. The linear bearings can be constructed telescopically and have a spindle lifting device. A cylinder, such as a hydraulic cylinder, may be provided instead of the spindle lifting device. The central connecting piece can be formed by the one or more pivot bearings. The pivot bearing can, for example, be designed so that the wheel associated with the associated leg can perform a pivoting movement relative to the base. The pivot beams can, for example, be mounted on the central connecting piece so as to be pivotable, for example, horizontally. In one embodiment, two pivot beams opposite the central connecting piece are mounted so as to be pivotable in pairs on the central connecting piece. These pivot beams can, for example, always run in a straight line; they can be designed to be integral and can, for example, only be pivotable with respect to the central connecting piece at the same time.

In another embodiment, each pivot beam is individually mounted so as to be pivotable on the central connecting piece and can be pivoted relative to the central connecting piece independently of further pivot beams.

In yet another embodiment, the support structure comprises a central bearing piece and at least one push beam. The base of the transport vehicle can comprise the central bearing piece or be formed thereby. Two push beams can, for example, be provided. The adjustment elements can then, for example, comprise a linear bearing between the at least one push beam and the central bearing piece, with which the push beam is slidably mounted on the central bearing piece. The push beam can, for example, have a head. The adjustment elements can then, for example, also each comprise a further linear bearing between the head and the horizontal portions. The linear bearings between the push beam and the central bearing piece and between the horizontal portion and the head can, for example, be designed so that each wheel can perform two different translational movements relative to the base, the directions of which can, for example, be perpendicular to one another. A linear bearing can, for example, be arranged between each head and each horizontal portion. The linear bearings can also be constructed telescopically in this embodiment and have a spindle lifting device or a cylinder, for example, a hydraulic cylinder. The push beams can, for example, be mounted so as to be horizontally displaceable via the linear bearings. Two push beams can, for example, be provided. The two push beams can, for example, be mounted opposite one another on the central bearing piece. A linear bearing can, for example, be provided between the head of a push beam and a leg, for example, so that the leg can be displaced in a horizontal direction relative to the push beam. The head can, for example, be arranged at the end of the push beam facing away from the central bearing piece. The head can, for example, be arranged perpendicular to the rest of the push beam.

Exactly one, two, or more or all of the wheels of the transport vehicle can be driven. A separate drive motor can be provided for each driven wheel.

The transport vehicle can, for example, not have a driver's cab, but be self-propelled so as to choose its own drive direction and/or drive speed. The transport vehicle can also be remote controlled.

The alignment of the transport vehicle and/or the transport process can be automated or partially automated, for example, so that a receiving position for a load is found automatically by the transport vehicle.

The required minimum width of an aisle in order to be able to be driven through by the transport vehicle can, for example, be smaller in the second state of the transport vehicle than in the first state. The transport vehicle can, for example, also be brought from the first state into the second state in the loaded state, for example, also vice versa.

The present invention also relates to a method for receiving a load by the transport vehicle.

In the method according to the present invention, the transport vehicle performs a driving movement which positions the transport vehicle relative to the load so that the load is arranged between the wheels. This driving movement is performed either in the transverse direction of the load to be picked up or in the longitudinal direction of the load to be picked up. This driving movement for receiving different loads can, for example, be performed one after the other both in the transverse direction of the load and in the longitudinal direction of the load. If this driving movement is performed in the transverse direction of the load to be picked up, the transport vehicle is aligned so that two wheels are arranged at the front in the drive direction that differ from those used when this driving movement is performed in the longitudinal direction of the load to be picked up.

The transport vehicle can, for example, be brought into its first state before this driving movement is performed in the longitudinal direction of the load to be picked up. The track width of the transport vehicle can, for example, be set smaller than the length of the load via the adjustment elements.

The transport vehicle can, for example, be brought into its second state before this driving movement is performed in the transverse direction of the load to be picked up. The wheelbase of the transport vehicle can, for example, be set shorter than the length of the load by means of the adjustment elements.

If this driving movement is performed in the longitudinal direction of the load to be picked up, the transport vehicle can, for example, be aligned so that the first side of the first rectangle is aligned parallel to the longitudinal extension of the load. If this driving movement is performed in the transverse direction of the load to be picked up, the transport vehicle can, for example, be aligned so that the second side of the second rectangle is aligned parallel to the transverse extension of the load.

If the track width of the transport vehicle is changed, the wheelbase of the transport vehicle can, for example, also be changed immediately before, at the same time, or immediately afterwards. This can, for example, apply to the longitudinal drive as well as the transverse drive.

The present invention also relates to a system comprising a transport vehicle and a load having a longitudinal direction and a transverse direction.

In this system, the transport vehicle is designed so that it allows the transport vehicle to move the load between the wheels, it being possible for this driving movement to be performed in the longitudinal direction of the load to be picked up as well as in the transverse direction of the load to be picked up.

A very compact loaded transport vehicle can, for example, be achieved compared to the size of the load. The transport vehicle can, for example, be brought into a first state in which, when it is loaded, its extension in the longitudinal direction of the load is not greater than the longitudinal extension of the load. The transport vehicle can, for example, be brought into a second state in which, when it is loaded, its extension in the transverse direction of the load is not greater than the transverse extension of the load.

In the embodiment with a four-wheeled transport vehicle, the first side of the first imaginary rectangle can, for example, be shorter than the longitudinal extension of the load. The second side of the second imaginary rectangle can, for example, be shorter than the transverse extension of the load.

In the loaded transport vehicle, either the wheelbase or the track width can, for example, be shorter than the longitudinal extension of the load. This can, for example, apply regardless of whether the load was approached in its longitudinal direction or in its transverse direction. The transport vehicle is thereby more compact than any transport vehicle, the wheelbase and track width of which is at least as large as the length of the load.

The load can, for example, have a height.

The transport vehicle can, for example, have load receiving elements having a stroke which is at least as great as the height of the load. It can thereby be achieved that a load can be stored in a second level above a first load with the transport vehicle.

It can also thereby be achieved that a load from a densely stored square (for example, in the port before loading) can be selected and picked up as desired and all other loads can be driven over therewith.

A transport vehicle that can also be brought into a compact state with regard to its height can be achieved if such a stroke is at least also achieved in that the transport vehicle has legs which are adjustable in length.

The present invention will now be explained in greater detail below under reference to the embodiments as shown in the drawings.

The first embodiment of the transport vehicle according to the present invention (hereinafter referred to as transport vehicle 100), shown in FIGS. 1 to 13 and denoted by 100, has a base A and four wheels 1, 1', 1", 1' connected to the base A. For the sake of simplicity, the base A is only symbolized by a rectangle in FIGS. 1 and 2 and is omitted in FIGS. 4 to 13. The transport vehicle 100 does not have a driver's cab, but is self-propelled.

Figure 2:
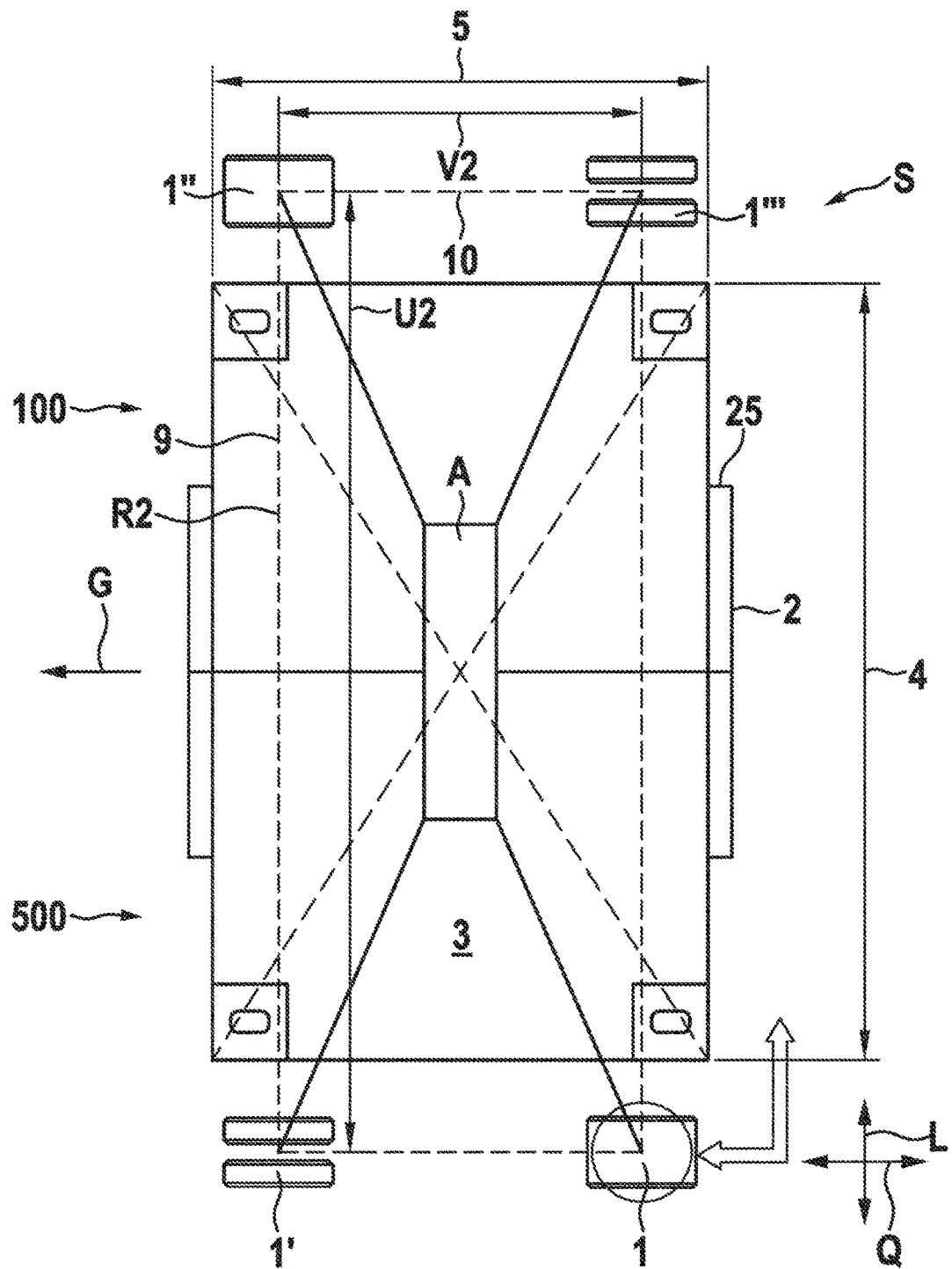
FIG. 2 shows the transport vehicle in a view as in FIG. 1, but in its second state.

The transport vehicle 100 has load receiving elements 2 and is, as shown, for example, in FIGS. 1 and 2, suitable for transporting a load 3 which has a longitudinal extension 4 and a transverse extension 5 between all wheels 1, 1', 1", 1'''. The transport vehicle 100 is a bidirectional vehicle which can be driven in a transverse drive G and in a longitudinal drive H (see FIGS. 1 and 2). All four wheels 1, 1', 1", 1''' of the transport vehicle 100 can be steered by at least 90°. Both in the longitudinal drive H and in the transverse drive G, at least two wheels 1, 1', 1", 1''' have a track width U1, U2 between each other (see also FIGS. 4 and 10) in each case. The track width U1 in longitudinal drive H as well as the track width U2 in transverse drive G are variable (see FIGS. 1 and 2).

Both in the transverse drive G and in the longitudinal drive H, at least two wheels 1, 1', 1", 1' have a wheelbase V1, V2 between each other (FIGS. 1 and 2). These wheelbases V1, V2 are also variable, both the wheelbase in transverse drive G and the wheelbase in longitudinal drive H. In the first state B shown in FIG. 1, the transport vehicle 100 protrudes beyond the load 3 in the transverse direction Q and does not protrude in the longitudinal direction L of the load 3. In the second state S shown in FIG. 2, the transport vehicle 100 protrudes beyond the load 3 in the longitudinal direction L and does not protrude in the transverse direction Q of the load 3.

Two of the four wheels are designed as twin tires and the other two as single tires. All wheels can be designed as single tires or all wheels can be designed as twin tires.

Adjustment elements 6 are provided via which the position of all wheels 1, 1', 1", 1' relative to the base A can be changed. In the first embodiment, these are designed so that all wheels 1, 1', 1", 1' can each perform a pivoting movement relative to the base A. The associated pivot axis is not shown in FIGS. 1 to 13.

The transport vehicle 100 is also suitable for lifting the load 3 between the wheels 1, 1', 1", 1'''. A load 3 stored at ground level can also be lifted with the load receiving elements 2.

The transport vehicle 100 can drive over the load 3, similar to a straddle carrier truck, when approaching, so that it is partially arranged above the load 3. The load receiving elements 2 are arranged on the base A and include suspensions. In the loaded state of the transport vehicle 100, the base A is arranged above the load 3, and the load receiving elements 2 transmit the weight of the load 3 to the base A.

Figure 4:
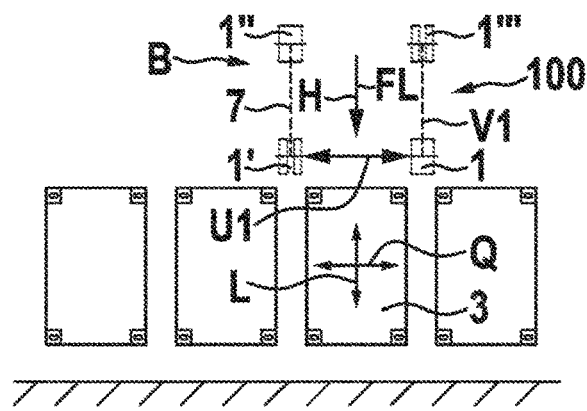
FIG. 4 shows a first view of the method according to the present invention for loading the transport vehicle from FIG. 1 in a view of the transport vehicle and the loads from above, whereby the loads are parked lengthways next to one another
Figure 10:
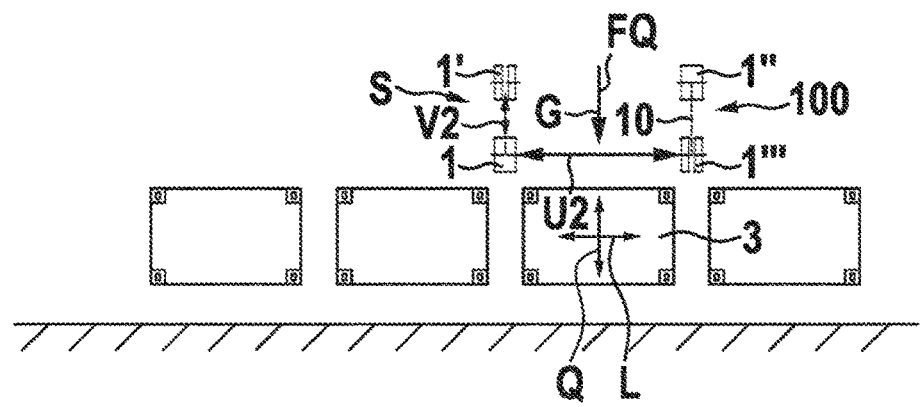
FIG. 10 shows a first view of the method according to the present invention for loading the transport vehicle from FIG. 2 in a view of the transport vehicle and the loads from above, whereby the loads are parked sideways next to one another

As a comparison of FIGS. 4 and 10 shows, the transport vehicle 100 allows the load 3 to be picked up to be approached both in its longitudinal direction L and in its transverse direction Q. In order to make this possible with overall compact dimensions, the transport vehicle 100 can be brought into a first state B in order to approach the load 3 in its longitudinal direction L and can be brought into a second state S in order to approach a load 3 in its transverse direction Q. The track width U1 in the first state is smaller than the track width U2 in the second state S. The wheelbase V1 in the first state B is larger than the wheelbase V2 in the second state S.

As FIGS. 1 and 2 show, the transport vehicle 100 can be brought, via the adjustment elements 6, from the first state B, in which the wheels 1, 1', 1", 1' form, as viewed from above, the corner points of a first imaginary rectangle R1 with a first side 7 and a second side 8 adjacent thereto, into a second state S, in which the wheels 1, 1', 1", 1' form, as viewed from above, the corner points of a second imaginary rectangle R2 with a first side 9 and a second side 10 adjacent thereto. The first side 9 of the second imaginary rectangle R2 is longer than the first side 7 of the first imaginary rectangle R1 and the second side 10 of the second imaginary rectangle R2 is shorter than the second side 8 of the first imaginary rectangle R1. The length of the first side 7 of the first imaginary rectangle R1 and the first side 9 of the second imaginary rectangle R2 is defined by the distance between the same wheels 1', 1" of the transport vehicle 100. The first imaginary rectangle R1 is more like a square than the second imaginary rectangle R2.

The load receiving elements 2 have a gripping element 25 which can be brought into engagement with the load 3. The gripping element 25 can be displaced up and down via a spindle lifting device. In addition to spindle lifting devices, other lifting elements, for example, cylinders, such as hydraulic cylinders, are conceivable.

As FIG. 10 shows, for example, when approaching the load 3 in its transverse direction Q, the wheelbase V2 of the transport vehicle 100 is shorter than the longitudinal extension 4 of the load 3.

Figure 3:
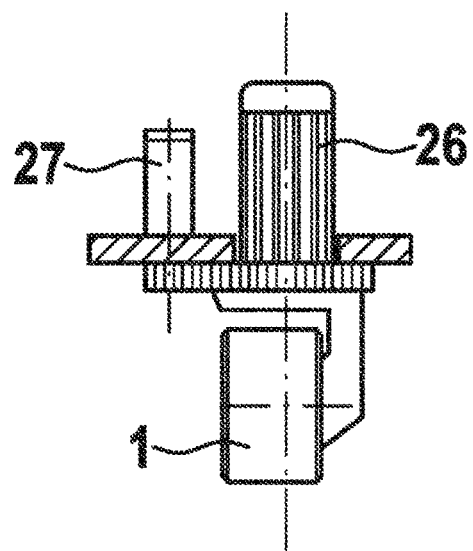
FIG. 3 shows a side view of a wheel of the transport vehicle shown in FIG. 1.

A separate drive motor 26 is provided for each of the two of the four wheels, namely, for the wheels arranged diagonally to one another and designed as single tires 1, 1" (FIG. 3). Each wheel 1, 1', 1", 1' has its own steering motor 27.

FIGS. 4 to 6 and FIGS. 10 and 11 each show an approaching movement towards the load 3.

Figure 5:
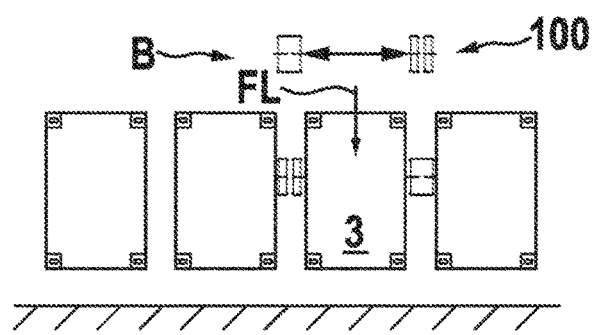
FIG. 5 shows a second view of the method according to the present invention for loading the transport vehicle from FIG. 1 in a view of the transport vehicle and the loads from above, whereby the loads are parked lengthways next to one another
Figure 6:
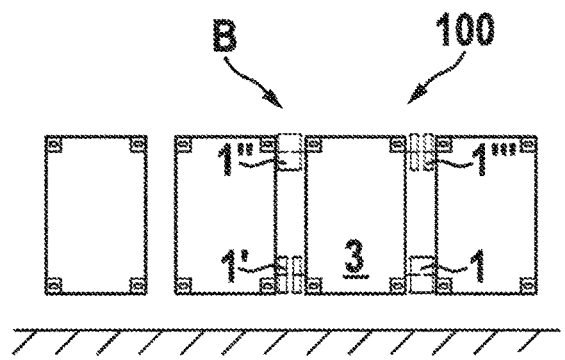
FIG. 6 shows a third view of the method according to the present invention for loading the transport vehicle from FIG. 1 in a view of the transport vehicle and the loads from above, whereby the loads are parked lengthways next to one another
Figure 11:
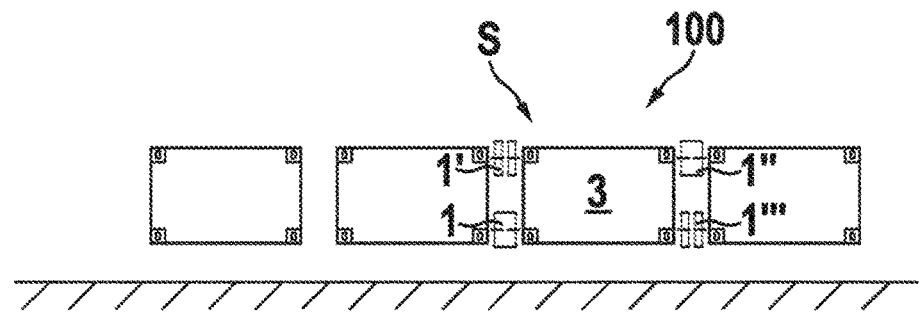
FIG. 11 shows a second view of the method according to the present invention for loading the transport vehicle from FIG. 2 in a view of the transport vehicle and the loads from above, whereby the loads are parked sideways next to one another

FIGS. 4 to 6 show this approaching movement in the longitudinal direction L of the load 3 to be picked up, and FIGS. 10 and 11 show this approaching movement in the transverse direction Q of the load 3 to be picked up.

A comparison of FIG. 4 with FIG. 10 shows that, when this driving movement FQ is performed in the transverse direction Q of the load 3 to be picked up, the transport vehicle 100 is aligned so that two wheels 1, 1' are arranged at the front in the drive direction that differ from the wheels 1, 1' arranged at the front in the direction of travel, when this driving movement FL is performed in the longitudinal direction L of the load 3 to be picked up.

It can be seen from FIG. 4 that the transport vehicle 100 is brought into its first state B before this driving movement FL is performed in the longitudinal direction L of the load 3 to be picked up. The track width of the transport vehicle 100 is set smaller than the length of the load 3 via the adjustment element.

FIG. 10 shows that the transport vehicle 100 is brought into its second state S and the wheelbase V2 of the transport vehicle 100 is set shorter than the length of the load 3 by means of the adjustment elements before this driving movement FQ is performed in the transverse direction Q of the load 3 to be picked up.

Figure 7:
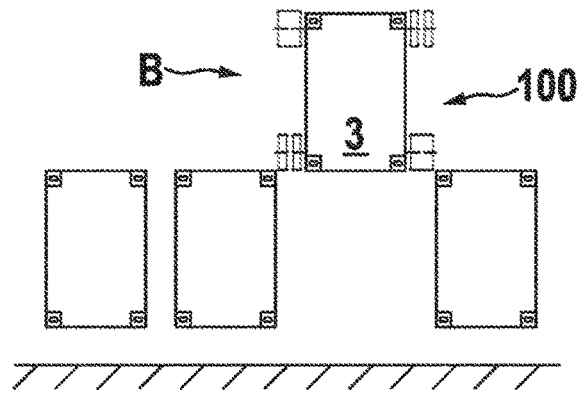
FIG. 7 shows a first view the drive of a loaded transport vehicle in a first state.
Figure 8:
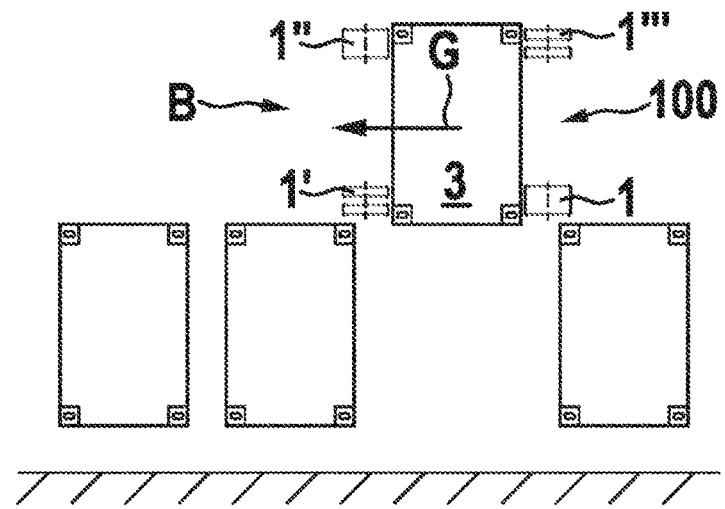
FIG. 8 shows a second view the drive of a loaded transport vehicle in a first state.
Figure 12:
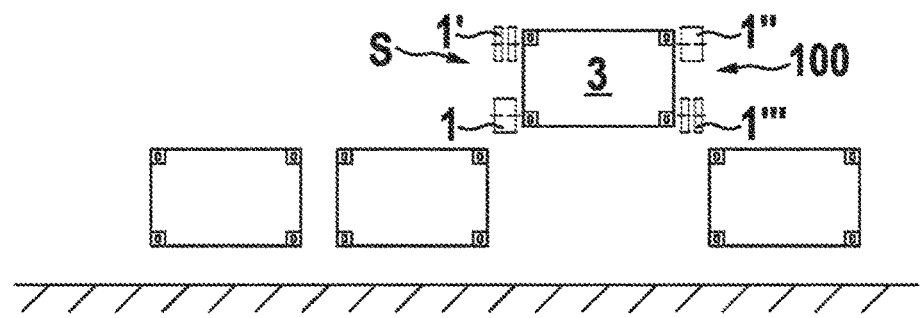
FIG. 12 shows a first view of the drive of a loaded transport vehicle in its second state.
Figure 13:
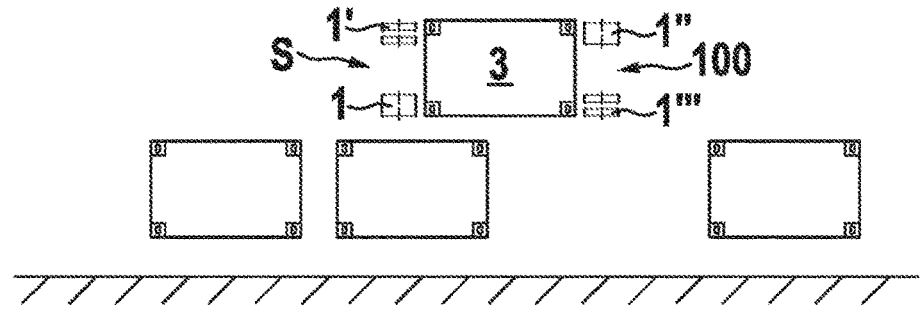
FIG. 13 shows a first view of the drive of a loaded transport vehicle in its second state.

FIGS. 7 and 8 show the drive of a loaded transport vehicle 100 in its first state B. FIGS. 12 and 13 show the drive of a loaded transport vehicle 100 in its second state S.

Figure 9:
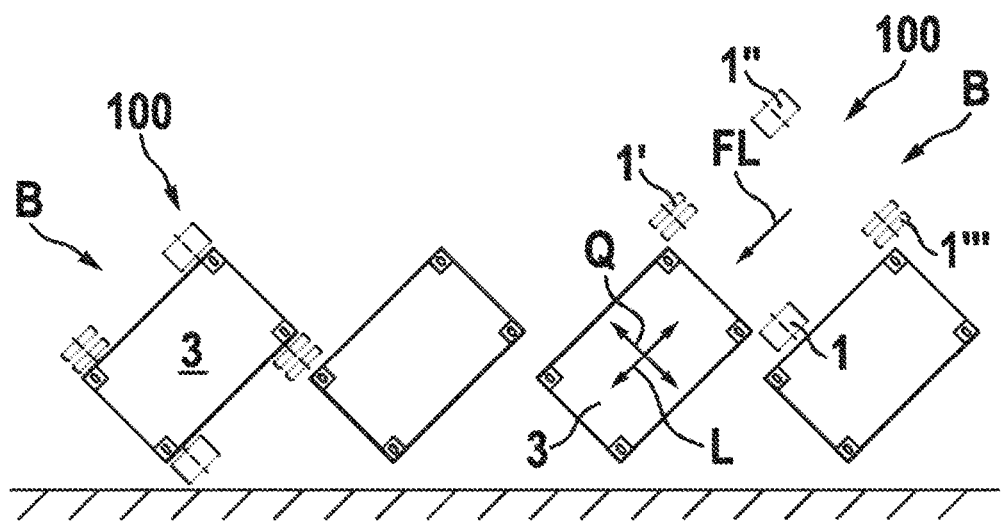
FIG. 9 shows that the transport vehicle is able to approach and to pick up loads placed at an angle to each other.

From a synopsis of FIGS. 4 to 13, it can be seen that the transport vehicle 100 is able to approach and to pick up loads 3 parked lengthways next to one another (FIGS. 4 to 8) as well as loads 3 stored next to one another (FIGS. 10 to 13). FIG. 9 shows this for loads 3 placed at an angle. The distance between the loads placed lengthways next to one another (FIGS. 4 to 8) can be smaller than half the difference between the longitudinal and transverse extension of the load 3.

As a comparison of FIGS. 7 and 12 shows, the required minimum width of an aisle in order to be able to be driven through by the transport vehicle 100 is smaller in the second state S of the transport vehicle 100 than in the first state B. The transport vehicle 100 can also be brought from the first state B to the second state S in the loaded state, for example, when, starting from the situation shown in FIG. 7, a narrow aisle is to be driven through. The load 3 is a container in the first embodiment.

Figure 14:
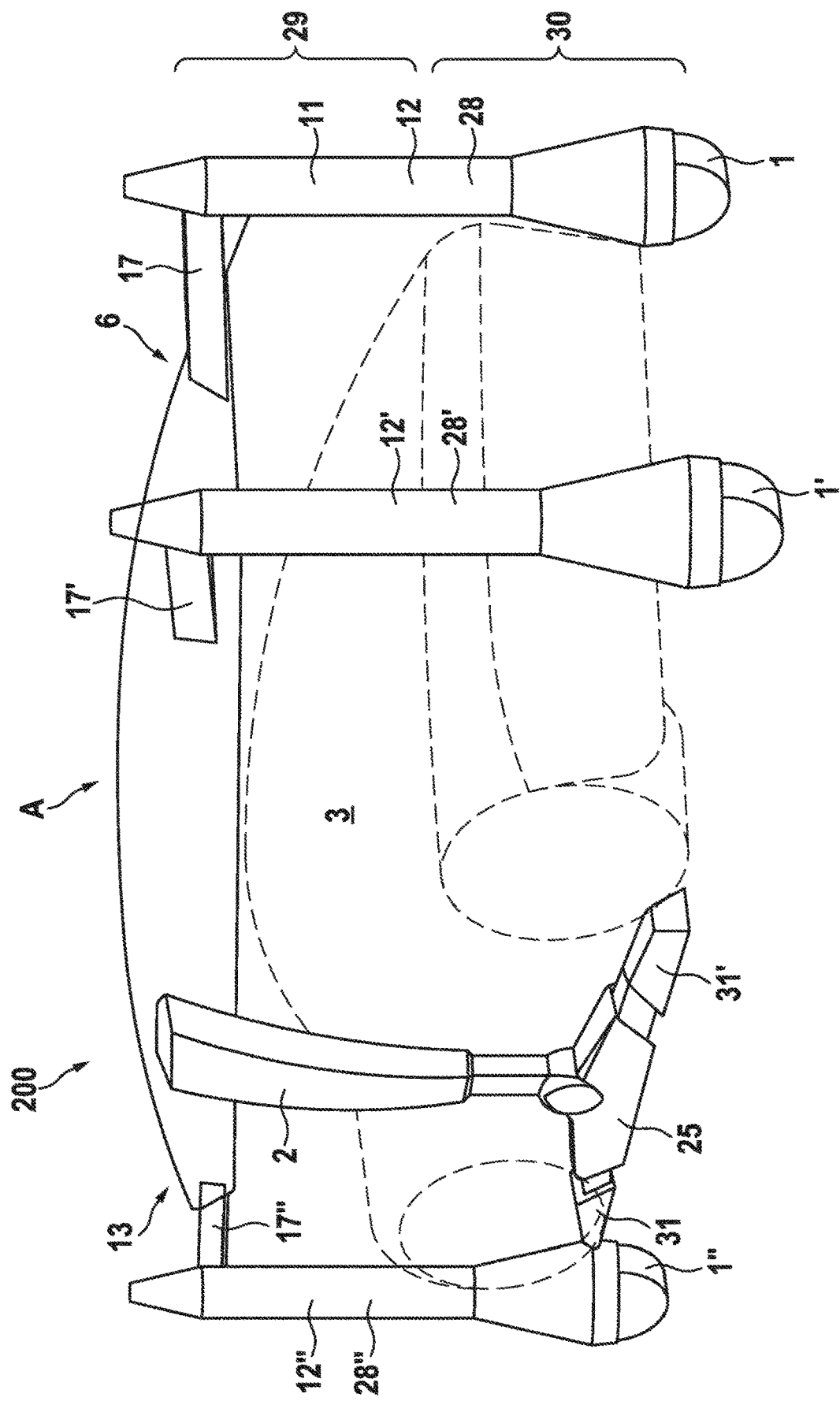
FIG. 14 shows a perspective view of a second embodiment of the transport vehicle in the loaded state.
Figure 15:
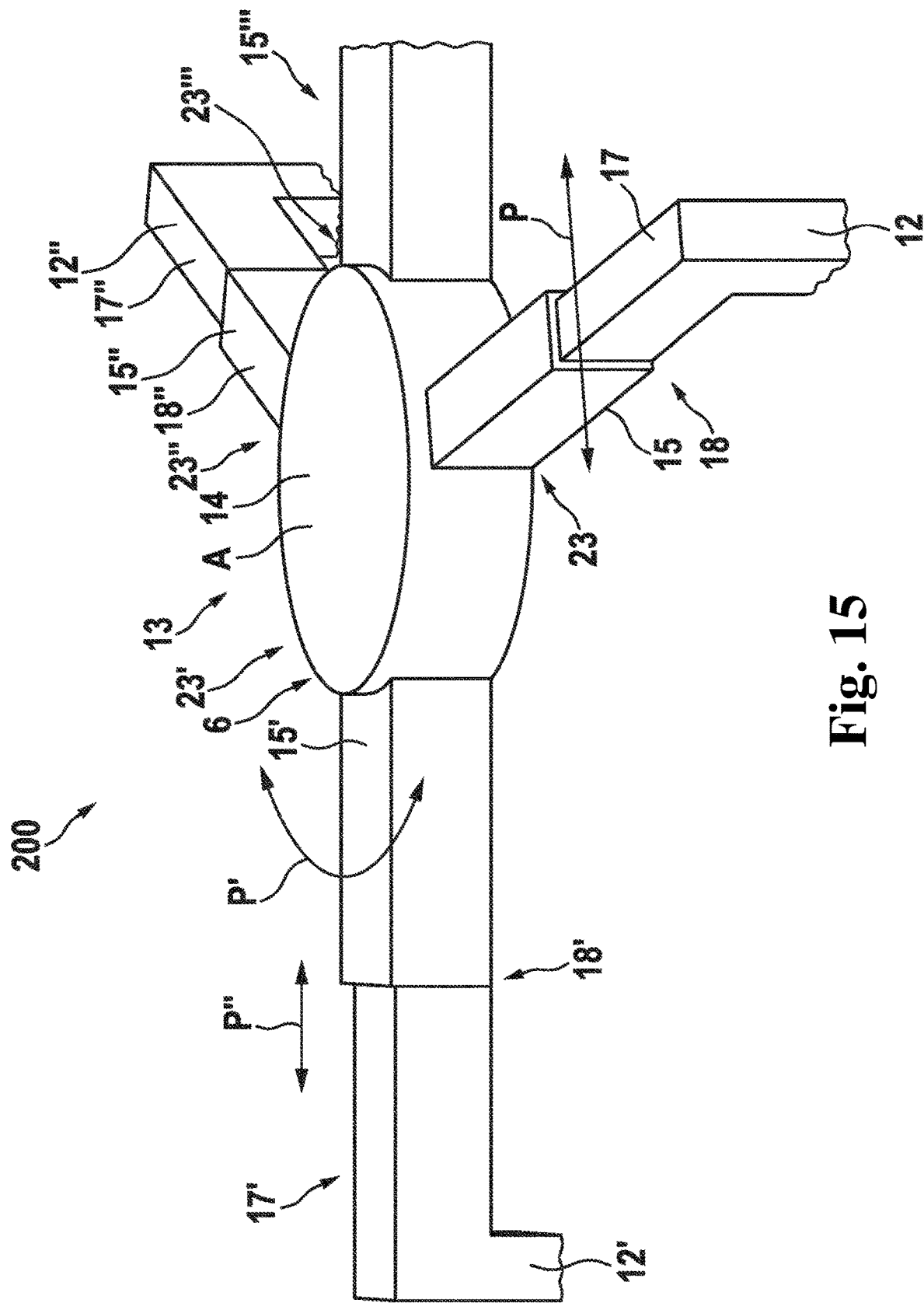
FIG. 15 shows a perspective view of a detail from FIG. 14.

Further embodiments are shown in FIGS. 14 to 19, whereby the same reference signs denote the same components. Reference is made in this respect to the description above. Only the differences from the first embodiment shown in FIGS. 1 to 13 are shown below:

The second embodiment of the transport vehicle according to the present invention (transport vehicle 200) shown in FIGS. 14 and 15 and designated by 200 comprises a drivable support frame 11 having four legs 12, 12', 12", 12''', in the lower region of which one of the four wheels 1, 1', 1", 1' is arranged. The drivable support frame 11 also comprises a support structure 13, which connects the legs 12, 12', 12", 12''' to one another in their upper region. The load receiving elements 2 are arranged on the support structure 13 and extend downward from the support structure 13. Legs 12, 12', 12", 12''' each have a substantially vertically extending portion 28, 28', 28", 28''' and a horizontal portion 17, 17', 17", 17''' that is integral therewith. The support structure 13 comprises a central connecting piece 14 and a horizontally running pivot beam 15, 15', 15", 15''' for each of the four legs 12, 12', 12", 12'''. In this embodiment, the base A of the transport vehicle 200 is formed by this central connecting piece 14 (see, for example, FIG. 15). The adjustment elements 6 each comprise a pivot bearing 23, 23', 23", 23''' between the pivot beams 15, 15', 15", 15''' and the central connecting piece 14. The pivot beams 15, 15', 15", 15' are mounted so as to be horizontally and individually pivotable on the central connecting piece 14 with the pivot bearing 23, 23', 23", 23''' (see arrows P and P' in FIG. 15).

The adjustment elements 6 also each comprise a telescopic linear bearing 18, 18', 18", 18''' between the pivot beams 15, 15', 15", 15''' and the horizontal portions 17, 17', 17", 17''' of the legs so that the leg can be displaced in a horizontal direction relative to the pivot beam in each case (see arrow P" in FIG. 15).

In this embodiment, the gripping element 25 has regions 31, 31' which are horizontally displaceable via a spindle lifting device or a cylinder, for example, a hydraulic cylinder, see FIG. 14.

Figure 16:
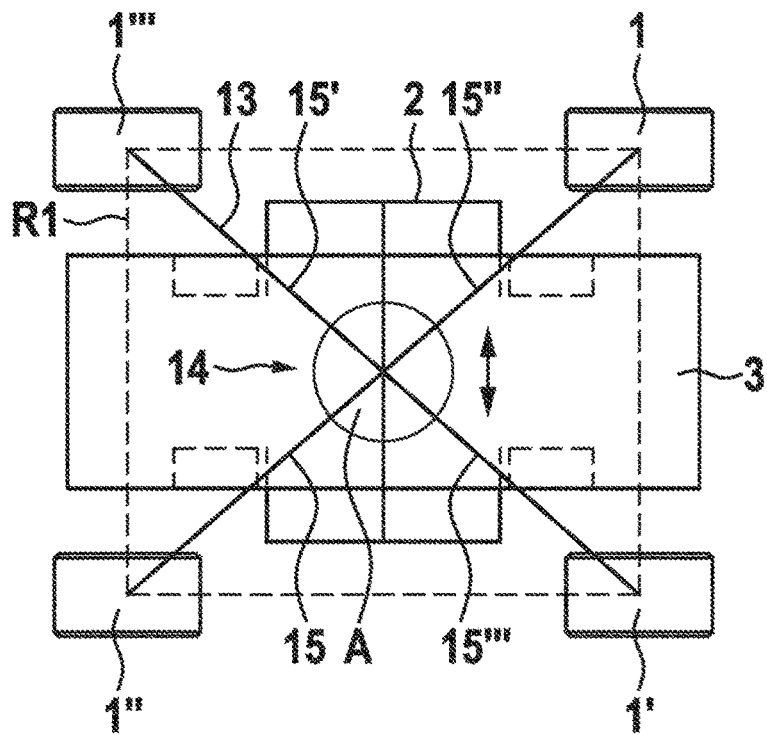
FIG. 16 shows a view from above of a third embodiment of the transport vehicle in its first state.
Figure 17:
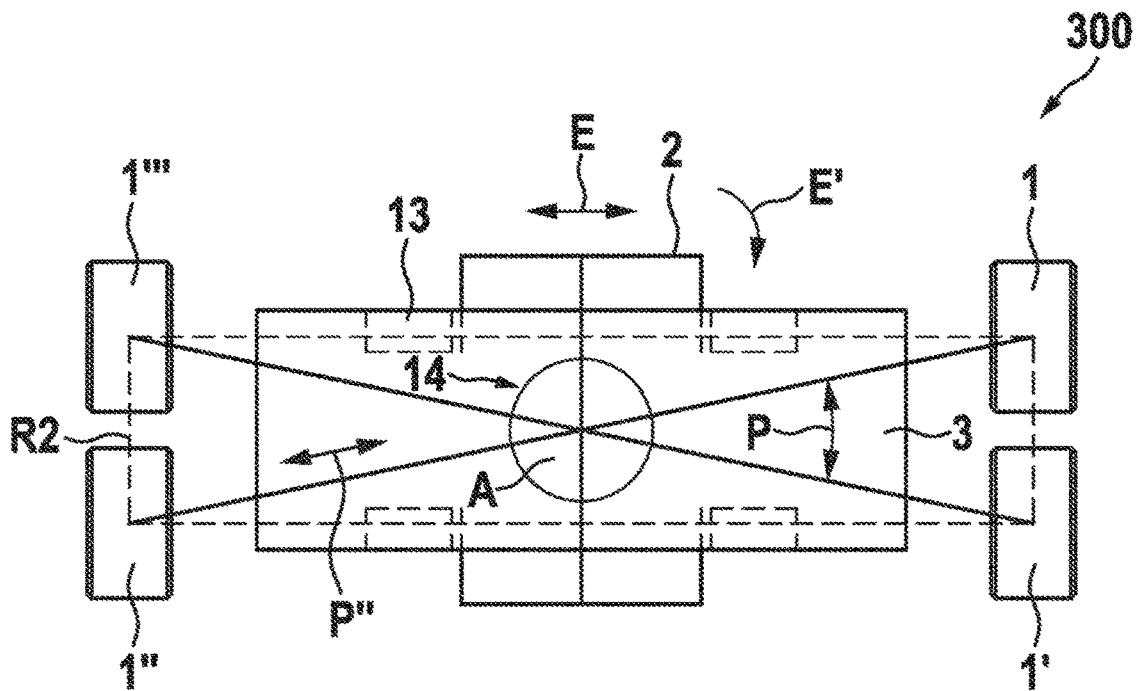
FIG. 17 shows the transport vehicle shown in FIG. 16 in its second state, viewed from above.

In the third embodiment of the transport vehicle according to the present invention (transport vehicle 300) shown in FIGS. 16 and 17 and denoted by 300, two pivot beams 15, 15" and 15', 15''' are each mounted so as to be pivotable in pairs on the central connecting piece. These integral pivot beams always run in a straight line. The load receiving elements 2 can be displaced and folded up relative to the base A, see arrows E, E' in FIG. 17.

In the second and third embodiments 200, 300, the adjustment elements 6 are designed so that all wheels 1, 1', 1", 1' can each perform either a translational movement relative to the base A and a movement running along a circular path relative to the base A.

Figure 18:
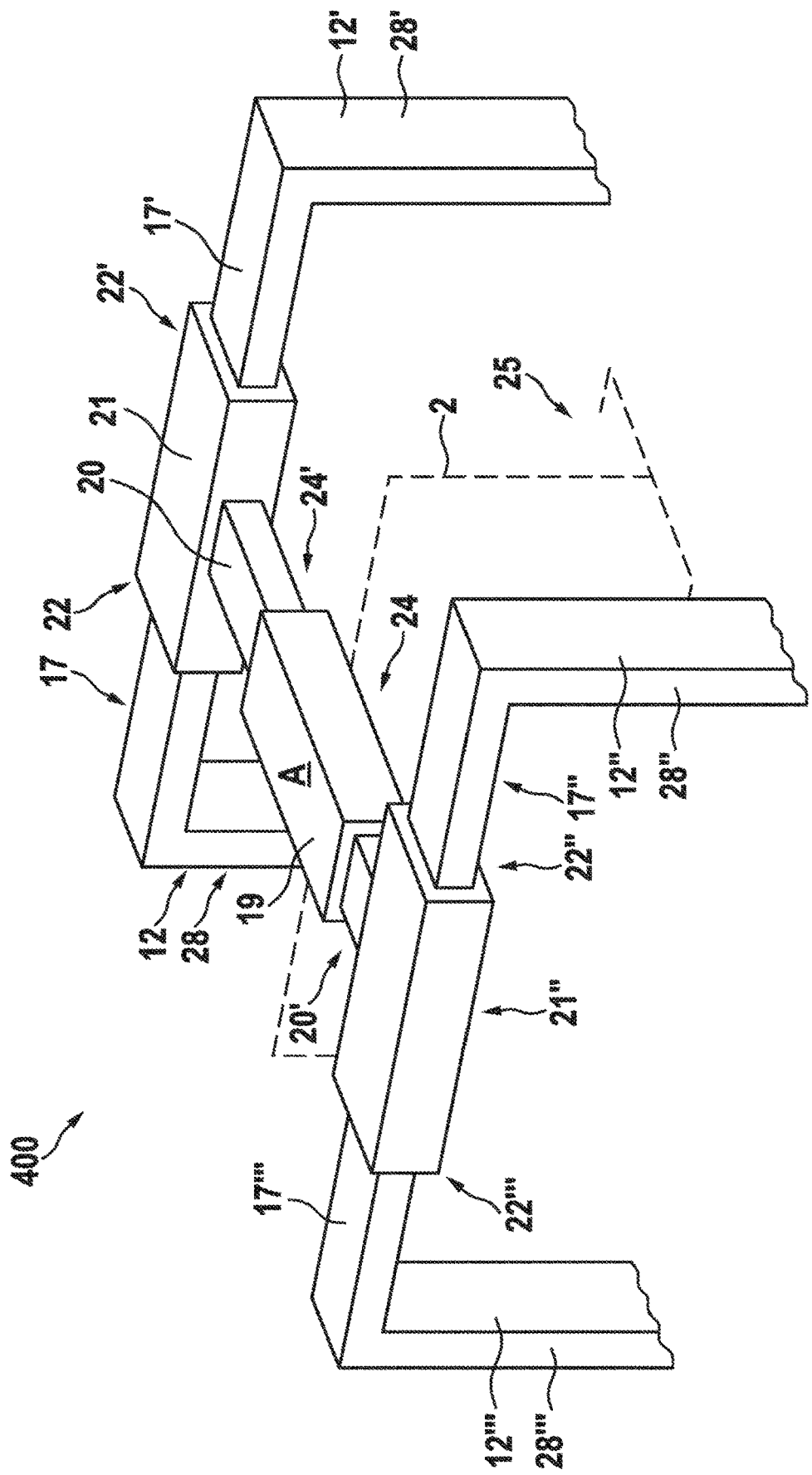
FIG. 18 shows a section of a perspective view of a fourth embodiment of a transport vehicle according to the present invention.
Figure 19:
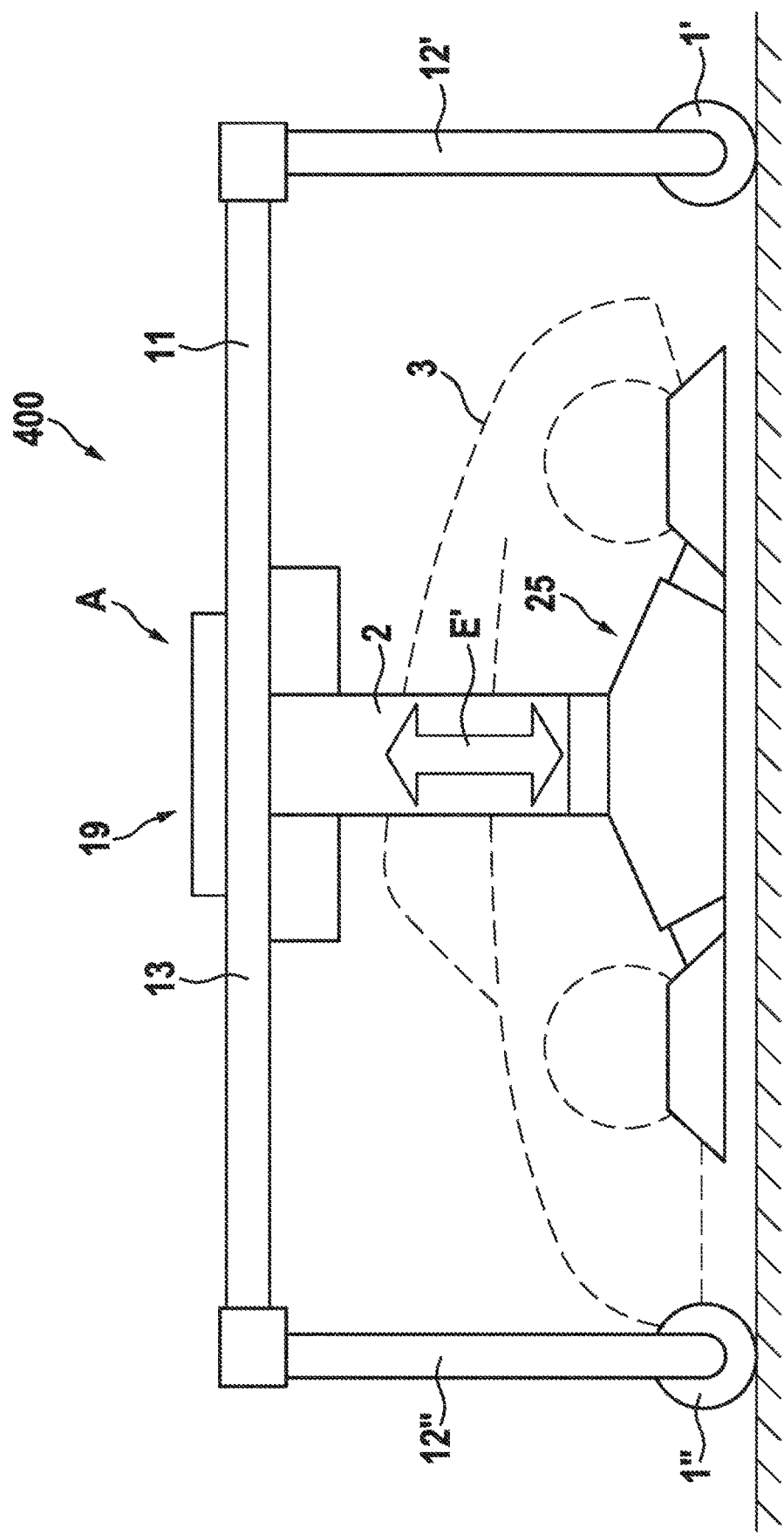
FIG. 19 shows the fourth embodiment of the transport vehicle according to the present invention in a side view.

In the fourth embodiment of the transport vehicle according to the present invention (transport vehicle 400) shown in FIGS. 18 and 19 and denoted by 400, the support structure 13 comprises a central bearing piece 19 and two push beams 20, 20'. In this embodiment, the base A of the transport vehicle 400 is formed by the central bearing piece 19. The load receiving elements 2 and the gripping element 25 are shown in FIG. 18 only by dashed lines.

The adjustment elements 6 each comprise a telescopic linear bearing 24, 24', between a push beam 20, 20' and the central bearing piece 19. The two push beams 20, 20' are mounted opposite one another on the central bearing piece 19 with the telescopic linear bearings 24, 24'.

Each push beam 20, 20' has a head 21, 21' and the adjustment elements 6 also each comprise a further telescopic linear bearing 22, 22', 22", 22''', between the head 21, 21' and the horizontal portions 17, 17', 17", 17''' of the legs 12, 12', 12", 12'''. The interaction of the load receiving elements 2 with the load 3 is shown in the fourth embodiment of the transport vehicle 400 in FIG. 19.

The adjustment elements 6 are designed in the transport vehicle 400 so that all wheels 1, 1', 1", 1' can each perform two different translational movements relative to the base A.

FIGS. 1, 2, 4 and 10 also show an embodiment of a system 500 according to the present invention comprising a transport vehicle 100 and a load 3 which has a longitudinal extension 4 and a transverse extension 5. The transport vehicle 100 is designed so that it allows a driving movement FL, FQ of the transport vehicle 100 arranging the load 3 between the wheels 1, 1', 1", 1''', it being possible for this driving movement FL, FQ to be performed in the direction L of the longitudinal extension 4 of the load 3 to be picked up as well as in the direction Q of the transverse extension 5 of the load 3 to be picked up. The first side 7 of the first imaginary rectangle R1 is shorter than the longitudinal extension 4 of the load 3. The second side 10 of the second imaginary rectangle R2 is shorter than the transverse extension 5 of the load 3. The transport vehicle 100 can be brought into a first state B in which, when it is loaded, its extension in the longitudinal direction L of the load 3 is not greater than the longitudinal extension 4 of the load 3 (see FIG. 1) and it can be brought into a second state S in which, when it is loaded, its extension in the transverse direction Q of the load 3 is not greater than the transverse extension 4 of the load 3 (FIG. 2). The load 3 is a motor vehicle in the second to fourth embodiments.

The present invention is not limited to embodiments described herein; reference should be had to the appended claims.

LIST OF REFERENCE NUMERALS 100, 200, 300, 400 Transport vehicle
500 System
1, 1', 1", 1''' Wheels
2 Load receiving elements
3 Load
4 Longitudinal extension of the load
5 Transverse extension of the load
6 Adjustment elements
7 First side of the first rectangle
8 Second side (of the first imaginary rectangle R1)
9 First side (of the second imaginary rectangle R2)
10 Second side of the second rectangle
11 Drivable support frame
12, 12', 12", 12''' Legs
13 Support structure
14 Central connecting piece
15, 15', 15", 15''' Pivot beam (of the support structure 13)
17, 17', 17", 17''' Horizontal portion of the leg
18, 18', 18", 18''' Telescopic linear bearing
19 Central bearing piece
20, 20' Push beam
21, 21' Head
22, 22', 22", 22''' Telescopic linear bearings
23, 23', 23", 23''' Pivot bearing
24, 24' Telescopic linear bearings
25 Gripping element 26 Drive motor
27 Steering motor
28, 28', 28", 28'" Vertical portion/Vertically extending portion
29 Upper region
30 Lower region
31, 31' Horizontally displaceable region (of gripping element 25)
A Base
B First state
E, E' Arrows
FL Driving movement in the longitudinal direction of the load
FQ Driving movement in the transverse direction of the load
G Transverse drive
H Longitudinal drive
L Longitudinal direction of the load
P, P', P" Arrows
Q Transverse direction of the load
S Second state
U1, U2 Track width
V1, V2 Wheelbase
R1 First imaginary rectangle
R2 Second imaginary rectangle
P, P' Arrows

What is claimed is:

1. A transport vehicle comprising:
a base;
wheels connected to the base, at least two of the wheels comprising a track width therebetween in each of a transverse drive and in a longitudinal drive, the track width in the longitudinal drive and the track width in the transverse drive each being variable; and
load receiving elements which comprise at least one of a carrying fork, a loading platform, and a gripping element, the load receiving elements being configured to engage a load which has a longitudinal direction and a transverse direction from below and to transport the load between the wheels,
wherein,
the transport vehicle is drivable both in the transverse drive and in the longitudinal drive.

2. The transport vehicle as recited in claim 1, wherein,
the at least two of the wheels further comprise a wheelbase between each other in each of the transverse drive and in the longitudinal drive, and
the wheelbase in the transverse drive and the wheelbase in the longitudinal drive are each variable.

3. The transport vehicle as recited in claim 1, further comprising:
adjustment elements which are configured to change a position of the at least two of the wheels relative to the base.

4. The transport vehicle as recited in claim 3, wherein the adjustment elements are further configured so that the at least two wheels can each perform a translational movement relative to the base.

5. The transport vehicle as recited in claim 3, wherein the adjustment elements are further configured so that the at least two wheels can each perform a pivoting movement relative to the base.

6. The transport vehicle as recited in claim 3, further comprising:
a drivable support frame comprising at least two legs, each of the at least two legs comprising an upper region and a lower region, one of the at least two wheels being respectively arranged in one respective lower region, a position of the at least two wheels being relative to the base being changeable; and
a support structure which connects the at least two legs to one another in the upper region thereof.

7. The transport vehicle as recited in claim 6, wherein,
the at least two legs each comprise a horizontal portion,
the support structure comprises a central connecting piece and a horizontally running pivot beam for each of the at least two legs, and
each of the adjustment elements comprises,
a pivot bearing which is arranged between the horizontally running pivot beams and the central connecting piece via which the horizontally running pivot beams are mounted so as to be pivotable in pairs or individually on the central connecting piece, and
a linear bearing which is arranged between the horizontally running pivot beam and the horizontal portion.

8. The transport vehicle as recited in claim 6, wherein,
the at least two legs each comprise a horizontal portion,
the support structure comprises a central bearing piece and at least one push beam which comprises a head, and
each of the adjustment elements comprises,
a linear bearing which is arranged between the at least one push beam and the central bearing piece via which the push beam is slidably mounted on the central bearing piece, and
a linear bearing which is arranged between the head and the horizontal portion.

9. A method for receiving a load using the transport vehicle as recited in claim 1, the method comprising:
performing, with the transport vehicle, a driving movement that positions the transport vehicle in relation to the load so that the load is arranged between the wheels, the driving movement being performed either in the transverse direction of the load or in the longitudinal direction of the load, and,
if the driving movement is performed in the transverse direction of the load, aligning the transport vehicle so that two other wheels are arranged at a front in a drive direction that differs from those used when the driving movement is performed in the longitudinal direction of the load.

10. A system comprising:
the transport vehicle as recited in claim 1; and
a load having a longitudinal direction and a transverse direction,
wherein,
the transport vehicle is provided so as to allow a driving movement of the transport vehicle while having the load arranged between the wheels thereof so as to make a performance of the driving movement possible both in the longitudinal direction of the load and in the transverse direction of the load.

* * * * *